(12) United States Patent
Belloso

(10) Patent No.: US 7,325,638 B1
(45) Date of Patent: Feb. 5, 2008

(54) MOTOR VEHICLE WITH A PRIMARY ENGINE FOR ACCELERATION AND SECONDARY ENGINE AUGMENTED BY AN ELECTRIC MOTOR FOR CRUISING

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 306 days.

(21) Appl. No.: 11/283,587

(22) Filed: Nov. 21, 2005

(51) Int. Cl.
*B60K 17/34* (2006.01)
(52) U.S. Cl. .......... 180/69.6; 180/14.2; 180/305; 180/337; 180/444; 180/65.3; 180/65.2; 475/5; 475/4; 475/335
(58) Field of Classification Search .......... 180/69.6, 180/54.1, 14.2, 305; 475/5, 4, 335; 701/61
See application file for complete search history.

(56) References Cited

U.S. PATENT DOCUMENTS

| | | | | |
|---|---|---|---|---|
| 2,462,902 | A * | 3/1949 | Rockwell et al. | 60/709 |
| 3,487,721 | A * | 1/1970 | Hiersig et al. | 74/661 |
| 4,585,949 | A * | 4/1986 | Takahashi | 290/1 C |
| 5,495,912 | A * | 3/1996 | Gray et al. | 180/165 |
| 5,957,991 | A * | 9/1999 | Yasuda | 701/84 |
| 6,179,078 | B1 * | 1/2001 | Belloso | 180/69.6 |
| 6,306,056 | B1 * | 10/2001 | Moore | 475/5 |
| 6,828,691 | B2 * | 12/2004 | Tu et al. | 290/40 C |
| 7,152,705 | B2 * | 12/2006 | Alster et al. | 180/65.2 |

* cited by examiner

*Primary Examiner*—Christopher P. Ellis
*Assistant Examiner*—Cynthia F. Collado
(74) *Attorney, Agent, or Firm*—Norman Rainer

(57) ABSTRACT

A motor vehicle having a primary internal combustion engine is equipped with a secondary engine and an electric motor to supplement the power produced by the primary engine. The primary engine provides power for acceleration and hill climbing. When in a cruising mode of travel, the primary engine is deactivated, and the secondary engine, which is smaller and more fuel-efficient than the primary engine, provides the driving power. The electric motor adjustably augments the power provided by the secondary engine.

14 Claims, 5 Drawing Sheets

MOTOR VEHICLE WITH A PRIMARY ENGINE FOR ACCELERATION AND SECONDARY ENGINE AUGMENTED BY AN ELECTRIC MOTOR FOR CRUISING

BACKGROUND OF THE INVENTION

1. Field of the Invention

This invention relates to hybrid vehicles which use electric motors powered by batteries in combination with internal combustion engines to improve fuel efficiency.

2. Description of the Prior Art

There is considerable interest in the development of hybrid vehicles to improve fuel efficiency without sacrifice in mechanical performance. Such vehicles combine the use of internal combustion engines and electric motors.

Some hybrid vehicles use a relatively small but fuel-efficient internal combustion engine to enable it to cruise economically, and use additional power from the electric motor to assist in acceleration and hill-climbing, etc. Others use the electric motor to cruise, and supplement it with power from the engine for acceleration and hill-climbing, etc. Still others use any combination of both modes of operation. Power from the engine is used to charge the batteries. Regenerative braking is sometimes used to assist in recharging the batteries and thereby conserve fuel.

Although the hybrid system significantly improves automotive fuel efficiency, it has many disadvantages. It often requires severe down-sizing of the engine to achieve improved fuel efficiency and therefore needs a powerful electric motor to add sufficient power for acceleration and hill-climbing. This requires a complex and expensive electrical control system, a set of high capacity, high output batteries, and a powerful electric motor, resulting in high initial cost and high maintenance costs. These costs may not be fully offset by savings attributable to the improved fuel efficiency of the vehicle. For instance, the limited useful life of the batteries will require them to be replaced before these savings are fully realized.

On the other hand, using a large engine in combination with a smaller, less powerful but less expensive electric motor system will not solve the problem either. Firstly, the larger engine will be less fuel-efficient because of its larger size. Then, to cruise economically the vehicle will still need a sufficiently powerful electric motor with high capacity powerful batteries to supply enough power for cruising, otherwise the larger engine will have to be operated more, simply to assist in cruising. This would reduce the vehicle's fuel efficiency, yet still largely retain the high initial and maintenance cost of the components of the system.

So far, therefore, the hybrid vehicle as an approach towards achieving fuel efficiency in motor vehicles is proving to be unsatisfactory. If the engine is downsized sufficiently to permit the vehicle to cruise economically, the electric motor has to be made powerful enough to give the vehicle acceptable acceleration and hill climbing capability; but the powerful electric motor is expensive and requires expensive high capacity batteries, resulting in high initial and maintenance cost. On the other hand, if the electric motor is made less powerful so as to reduce its cost and the cost of the batteries, then the engine will need to be more powerful (and less fuel efficient) in order for the vehicle to have acceptable acceleration and hill-climbing capability.

What is needed is a system that will not only permit sufficient downsizing of the engine that is used for cruising so that the vehicle can cruise over long distances with significantly reduced fuel consumption, but will also permit sufficient downsizing of the electric motor and batteries. Such downsizing should be accomplished without sacrifice in the accelerating and hill-climbing performance of the vehicle, and preferably without extensive redesign of motor vehicles as they currently exist.

The prior art has not met this need. The present invention is intended to provide a solution to this problem. It does so by recognizing that motor vehicles really need two distinct types of power sources in order to have satisfactory mechanical performance and to achieve high fuel efficiency for long distance travel. These requirements are, namely, (1) a power source with high power output and high torque for acceptable acceleration, towing and hill-climbing capability, and (2) a lower power output power source capable of providing continuous lower power with high fuel-efficiency for long distance travel at cruising speeds. This invention meets the first requirement through the use of the standard power train of current motor vehicles without any essential modifications, and then meets the second requirement through the use of a fuel-efficient hybrid system comprising a secondary, smaller internal combustion auxiliary engine augmented by an electric motor for cruising. Furthermore mechanical efficiency of this hybrid system is improved by directly coupling the hybrid system to the drive axle, bypassing the transmission, thereby eliminating any frictional power losses generated in the transmission.

The manner of interaction of these various drive components are unobvious and they produce these unexpected advantages. This particular combination of parts and the manner in which they interact to achieve these results has not previously been described.

U.S. Pat. No. 6,179,078 to Belloso discloses an inexpensive, fuel-efficient automobile which uses two internal combustion engines; two for acceleration and one for cruising. Each engine is coupled to a driving wheel via a torque converter. It uses an electric motor for reverse motion, not for the purpose of improving fuel economy.

U.S. Pat. No. 6,852,062 to Abner, et. al., discloses two internal combustion engines and one or two starter/generators, all coupled to one transmission. It uses two engines to start and then uses the engines and motors to individually or jointly transmit power to the transmission thence to the drive wheels of the vehicle. None of the engines or motors bypass the transmission for the purpose of eliminating frictional power losses. The many modifications necessary to couple the two internal combustion engines and starter/generators to the transmission and to coordinate their functions make it difficult to use this system as an add-on feature to currently existing motor vehicles.

U.S. Pat. No. 6,722,458 to Hofbauer discloses two internal combustion engines which are both coupled by clutches to one transmission which drives the drive wheels. It further discloses the use of one or two electric motors. The vehicle starts and accelerates on power from the two engines, possibly supplemented by power from the motor(s), and cruises on power from one engine, one motor or a combination of both. Neither of the engines bypass the transmission for the purpose of eliminating frictional power losses generated therein. It does not teach the specific use of a fuel-efficient engine directly coupled to the differential primarily for the purpose of maintaining the vehicle at cruising speed. The many modifications needed to couple both engines and possibly one electric motor to the transmission and the associated control means to coordinate their function make it difficult to adapt this system as an add-on feature to existing motor vehicles.

U.S. Pat. No. 6,306,056 to Moore discloses a dual engine hybrid electric vehicle including two internal combustion engines and one motor/generator. Both engines are coupled to one transmission which is then coupled to the differential and drive wheels. During normal driving conditions a single engine is used. When load increases, the electric motor is used temporarily, then the second engine is speeded up to assist the first engine. Presumably both engines are used to start and accelerate the vehicle until it reaches normal driving conditions, wherein one engine may be turned off. Neither engine bypasses the transmission for the specific purpose of eliminating any frictional power losses generated therein. The many modifications necessary to couple both engines to a single transmission makes this system unacceptable as an add-on feature for an existing vehicle.

U.S. Pat. No. 5,492,189 to Kriegler, et. al., discloses a hybrid drive system comprising one internal combustion engine operating in steady-state mode and two transiently operating engines configured as hydraulic engines or electric motors. All engines are coupled to a planetary gear system with associated control means for coordinating the functioning of the internal combustion engine and the two transient engines. It does not disclose use of two internal combustion engines. It does not teach use of a primary internal combustion engine combined with a secondary internal combustion engine augmented by an electric motor bypassing the transmission, for the specific purpose of maintaining the vehicle at cruising speed. Furthermore, the many new features and modifications to adapt this system to a planetary gear system precludes easy application as an add-on feature to current motor vehicles.

U.S. Pat. No. 6,814,686 to Carriere, et. al., discloses primary and secondary engines and a phase clutch interactive between the crankshafts of the primary and secondary engines to provide proper coupling of the crankshafts. Both engines are coupled to one transmission which transmits power to drive the vehicle. Both engines are used to start and accelerate, and one engine is used to cruise.

It is accordingly an object of this invention to provide a hybrid vehicle capable of traveling at cruising speed for long distances with improved fuel efficiency.

It is another object of the present invention to provide a vehicle as in the foregoing object which does not require expensive powerful electric motors and powerful high-capacity batteries.

It is a further object of this invention to provide a vehicle of the aforesaid nature having sufficient power for quick acceleration and good hill-climbing abilities.

It is a still further object of the present invention to provide a component system for enhancing the fuel efficiency of motor vehicles, said system being amenable to installation into current motor vehicles in the streets and preserving the integrity of the power train of these vehicles.

It is yet another object of this invention to provide a hybrid vehicle with improved fuel efficiency and reduced manufacturing and maintenance costs.

These objects and other objects and advantages of the invention will be apparent from the following description.

SUMMARY OF THE INVENTION

In summary, the above and other beneficial objects and advantages are accomplished in accordance with the present invention by a hybrid motor vehicle having a chassis, front and rear paired wheels, at least one of said pairs serving as driving wheels, and an improved power train comprising:

a) a primary internal combustion engine mounted on said chassis, said primary engine being of suitable size and power to accelerate said vehicle to cruising speed in an acceptable acceleration rate and provide acceptable hill-climbing and load-carrying capacity, a speed change transmission interactive with said primary engine and associated means for transmitting power to said driving wheels, b) a secondary internal combustion engine mounted on said chassis, said secondary engine being of suitable size and power so that when operating at maximum efficiency it is capable of maintaining said vehicle at an acceptable cruising speed with maximal fuel efficiency, and associated means for transmitting power to said driving wheels while said vehicle is operated at cruising speed, c) an electric motor mounted on said chassis, an associated rechargeable storage battery which activates said motor, a generator which recharges said battery, and power transfer means for transmitting power from said electric motor to said driving wheels to provide supplemental power for cruising, d) means for shifting said transmission to neutral after said vehicle has been accelerated to cruising speed by said primary engine, and causing said vehicle to be maintained at cruising speed by power from said secondary engine supplemented, as needed, by power from said electric motor, and e) means for shifting said transmission to "drive" to supply additional power from said primary engine whenever more power needs to be supplied to said drive wheels beyond that supplied by said secondary engine and electric motor.

The fundamental feature of this invention is that it uses a hybrid system comprised of said secondary engine and electric motor simply to maintain the vehicle at cruising speed. Since the power needed for cruising is much less than the power needed for acceleration and hill climbing, using the hybrid system solely for cruising results in fuel efficiency and permits downsizing and simplification of the system. For instance, the secondary engine used for cruising can be relatively small and therefore more fuel-efficient. Since the electric motor is not needed for acceleration and hill-climbing, but merely to assist the secondary cruiser engine in maintaining the vehicle at cruising speed, it also can be of relatively small size. Furthermore, since power from the motor is only used intermittently as needed to assist the secondary engine, the battery will not need to be as large and powerful as those used in current hybrid engines. For most vehicles, inexpensive lead-acid batteries may prove quite adequate.

Although the above-described downsizing of the secondary engine and its electric motor results in improvement in fuel efficiency for long distance travel at cruising speeds, increased power is periodically required for acceleration and hill-climbing. The improved power train of the present invention meets such need by the selective utilization of the power train of the existing motor vehicle, into which the components of the improved power train of this invention are installed. Since the engine of the existing vehicle is used only for limited periods of time, especially when traveling over long distances on the highways, the fact that it is relatively less fuel-efficient does not significantly affect the over-all fuel economy of a vehicle equipped with the improved power train of this invention. It is estimated that the vehicle will be traveling on the fuel-efficient secondary cruiser engine at least 50% of the time during city driving and up to 90% of the time while traveling on the highway, resulting in substantial fuel savings.

BRIEF DESCRIPTION OF THE DRAWING

With these and other advantages in view, the invention is disclosed in the following description which will be more fully understood when read in conjunction with the following drawings in which.

For clarity of illustration, details which are not relevant to the invention, such as control linkages, gearshift linkages, internal parts of speed change transmissions, differentials and transaxles, engine mounts, suspension, etc., have been largely omitted from these drawings.

DESCRIPTION OF THE PREFERRED EMBODIMENT

Figure 1:
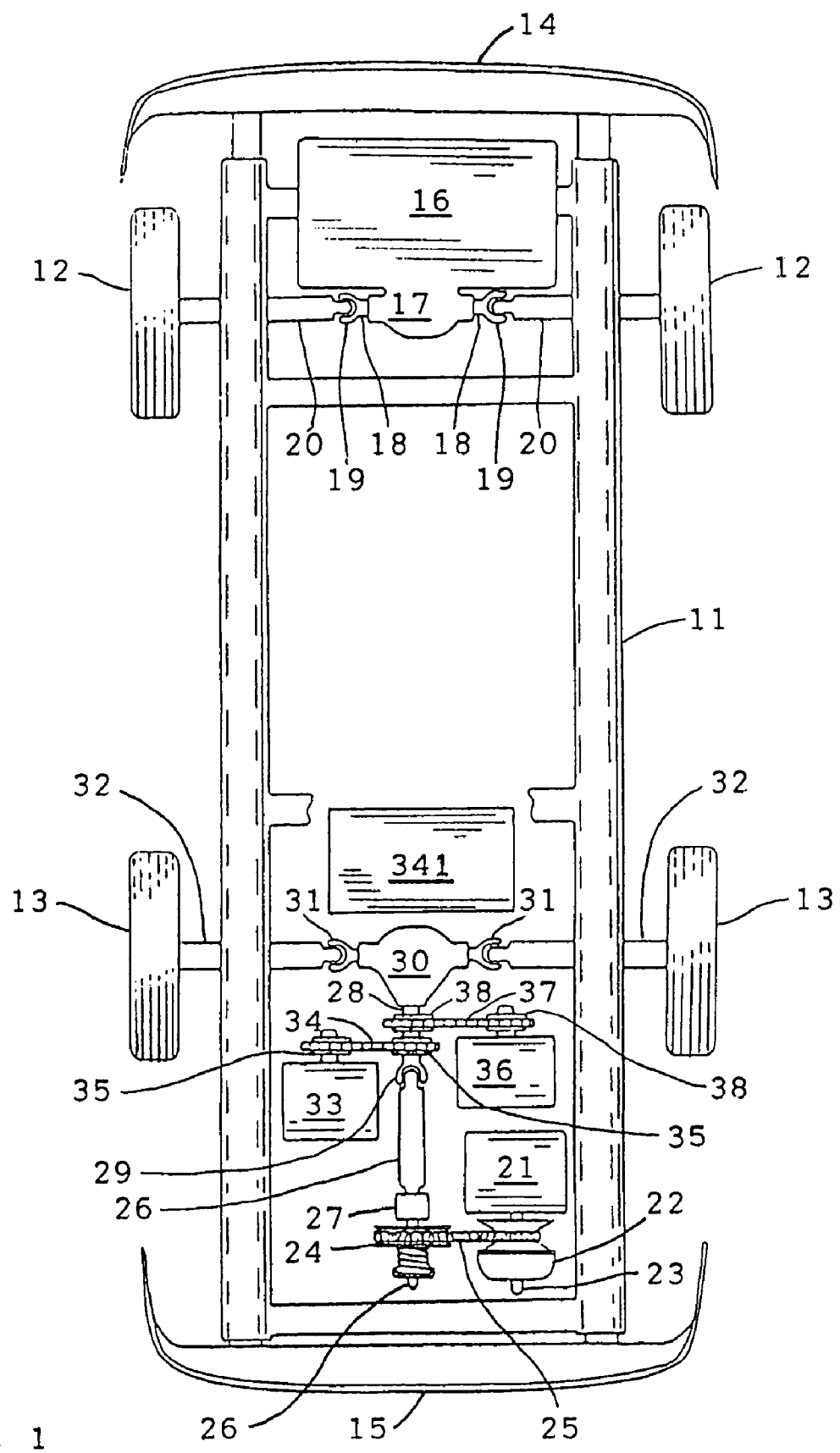
FIG. 1 is a schematic top view of a motor vehicle equipped with an embodiment of the improved power train of this invention.

Referring now to the aforesaid drawings, there is shown in FIG. 1 a motor vehicle chassis 11 with front wheels 12, rear wheels 13, front bumper 14 and rear bumper 15. Mounted at the front portion of the chassis 11 is a commonplace standard engine component of an existing vehicle, herein designated as primary engine 16. In the illustrated embodiment, engine 16 drives the front wheels 12 through its transaxle 17, left and right halfshafts 18, left and right front universal joints 19 and left and right axles 20. This is essentially the layout of a standard front engine, front wheel drive vehicle. In fact, the size and power of primary engine 16 may be the same as those engines generally used in a regular non-hybrid vehicle of similar size. The transaxle 17 combines the functions of a speed change transmission, either manually operated or automatic, and the differential. In this embodiment, the transaxle 17 can be shifted to "neutral" while the vehicle is in motion, a feature which is common to most vehicles. Primary engine 16 is used to accelerate the vehicle from a dead stop to cruising speed. It is also used whenever increased power is needed, such as when climbing a hill, passing another vehicle or towing a trailer, etc. It is also used to move the vehicle in reverse.

A secondary engine 21 is mounted at the rear portion of chassis 11. Engine 21 may also be referred to as a "cruiser" or "auxiliary" engine. CVT driver pulley 22 is mounted on the output shaft 23 of said engine 21 and is connected to driven pulley 24 by drive belt 25. Driven pulley 24 is mounted on jack shaft 26 which is journaled on jack shaft bearing 27 and connected to pinion shaft 28 through jack shaft universal joint 29. Pinion shaft 28 transmits power to rear differential 30 which is fixedly mounted on chassis 11. Differential 30 transmits power to rear wheels 13 through rear universal joints 31 and rear axles 32 with independent rear suspension.

After the vehicle is accelerated to cruising speed by power from primary engine 16, transaxle 17 is shifted to neutral, and secondary engine 21 is speeded up to transmit power through drive pulley 22, drive belt 25, driven pulley 24, jack shaft 26, pinion 28, differential 30, universal joints 31, and rear axles 32 to rear wheels 13 to keep the vehicle moving forward at cruising speed. If more power is needed from time to time, electric motor 33 is switched on to draw variable amounts of power from battery 341 and transmit supplemental power to rear wheels 13 via motor drive chain 34 sprockets 35, pinion 28, differential 30, universal joint 31 and axles 32. When the vehicle needs to be slowed down, part of its kinetic energy can be converted to electricity by generator 36 which is connected to pinion 28 by generator chain 37 and sprockets 38, well known to the art as regenerative braking. Other variations and features of regenerative braking, well known in the prior art, may be employed but need not be described here. The electrical connections and controls between the motor 33, battery 341 and generator 36 are also well known in the prior art, and do not need to be shown and described in this disclosure.

The novel feature of this invention is that it uses an add-on hybrid power system comprised of secondary engine 21 and electric motor 33 to maintain the vehicle at cruising speed, and uses primary engine 16 for acceleration, hill climbing and reverse functionality. Because only a comparatively small amount of power is needed to maintain the vehicle at cruising speed, the hybrid power system can be downsized. This results in increased improvement in fuel efficiency as well as in reduction in the initial and maintenance costs of the secondary engine, battery and electric motor.

Furthermore, since the hybrid power system is essentially used only for what really amounts to an "overdrive" function, it does not really need to have a regular speed change transmission. One speed ratio serves perfectly well. At most, a limited range of speeds such as those provided by a movable sheave continuously variable ratio torque converter (CVT) may be quite satisfactory, resulting in further cost savings.

Figure 2:
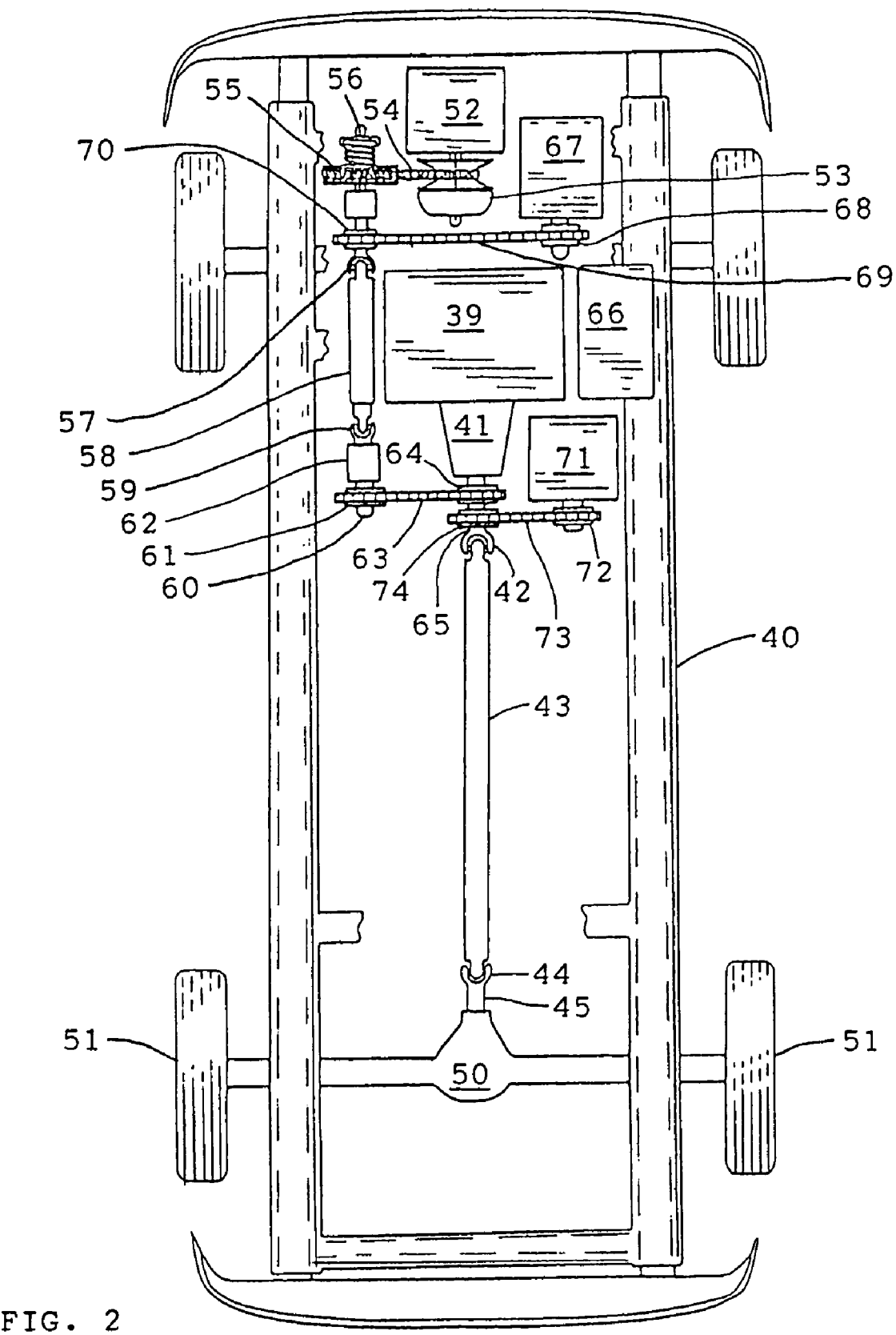
FIG. 2 is a schematic top view of a motor vehicle equipped with an alternative embodiment of the improved power train of this invention.

FIG. 2 illustrates how the invention may be embodied in a motor vehicle with standard front engine, rear wheel drive layout with a live unsprung rear axle, with provision to place the hybrid system at the front portion of the vehicle as well. This frees the rear portion of the vehicle for other uses such as for the trunk or cargo space. Primary engine 39, which may be any commonplace automotive engine, is mounted on chassis 40, and is connected to speed change transmission 41, which may be manual or automatic. Rotary power from said transmission is forwarded sequentially to front universal joint 42, propeller shaft 43, rear universal joint 44, pinion 45, and differential 50 to rear drive wheels 51. This is a popular layout for pickup trucks, SUV's, high performance cars and many luxury sedans. These vehicles may therefore retain their regular engines, transmissions and differentials, then be modified by installation of the hybrid cruiser system of this invention to achieve long distance travel capability with economical fuel cost. In effect this invention allows the owners to have it both ways: retain their much desired powerful original engine for fast acceleration, heavy towing, and high load carrying capacity, etc., and at the same time have a fuel efficient hybrid engine system with which to cruise economically over long distances. Furthermore, while long mileage is accumulated on the secondary engine, the primary engine is spared from excessive wear.

Further in FIG. 2, secondary engine 52 is mounted on chassis 40. It delivers power to rear drive wheels 51 through a CVT system comprised of drive pulley 53, drive belt 54, driven pulley 55, front jack shaft 56, front small universal joint 57, short propeller shaft 58, rear small universal joint 59, rear jack shaft 60, rear jack shaft sprocket 61, rear jack shaft chain 63, and first transmission output shaft sprocket 64. Power transmitted from secondary engine 52 to sprocket 64 is then further transmitted to transmission output shaft 65, universal joint 42, propeller shaft 43, rear universal joint 44, pinion 45, and differential 50 to drive wheels 51.

The vehicle is driven from a standing start to cruising speed by power from primary engine 39 transmitted through speed change transmission 41, propeller shaft 43 and differential 50 to drive wheels 51 in the conventional manner. After cruising speed is attained, speed change transmission 41 is shifted to neutral, and primary engine 39 is run at idle speed, or stopped to conserve fuel. If it is stopped, means are provided to automatically restart it when additional power is needed, and speed change transmission 41 is engaged. Secondary engine 52 is then speeded up to transmit power to drive wheels 51, through the CVT system and connections previously described, to keep the vehicle at cruising speed. When further power is needed to maintain the speed of the vehicle, a variable amount of electric power from battery 66 is transmitted to electric motor 67, from which additional mechanical power is transmitted through motor sprocket 68, motor chain 69, and front jack shaft sprocket 70 to front jack shaft 56 upon which front jack shaft sprocket 70 is fixedly mounted. Thus, additional power from electric motor 67 is ultimately supplied to drive wheels 51 as needed to assist secondary engine 52 in maintaining the vehicle at the desired cruising speed.

When the vehicle needs to be slowed down or stopped, the kinetic energy of the vehicle can be converted to electricity through regenerative braking as used in most hybrid vehicles. For this purpose generator 71 is connected through generator sprocket 72, generator chain 73 and rear transmission output shaft sprocket 74 to the transmission output shaft 65. Thus, rotation of wheels 51 is transmitted through differential 50, pinion 45, rear universal joint 44, propeller shaft 65, thence through chain 73 and sprockets 74 and 72 to drive generator 71. Electrical connections and other associated means and features used in the operation of the hybrid system are well known in the art and need not be described here.

Figure 3:
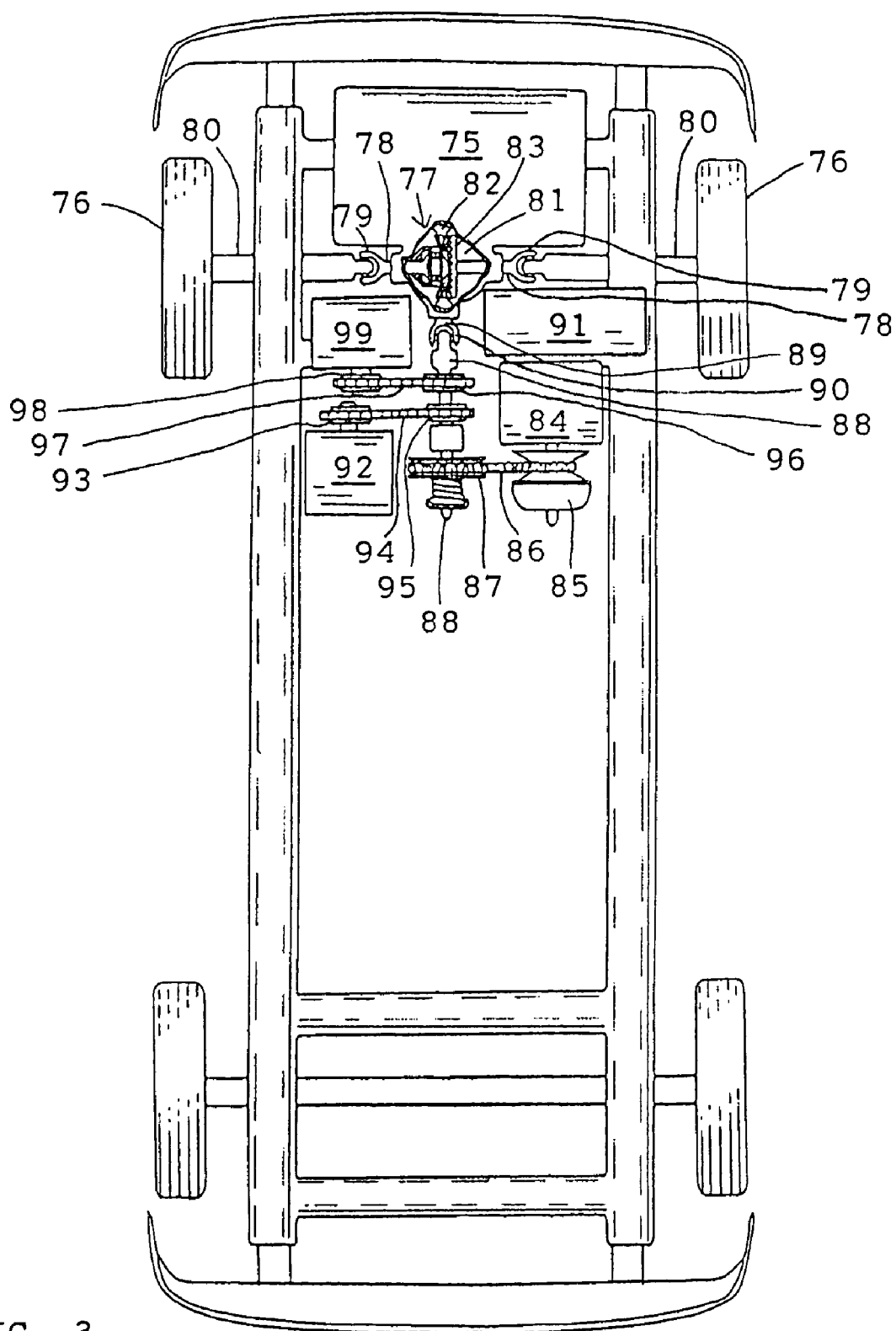
FIG. 3 is a schematic top view of a motor vehicle equipped with a second alternative embodiment of the improved power train of this invention.
Figure 4:
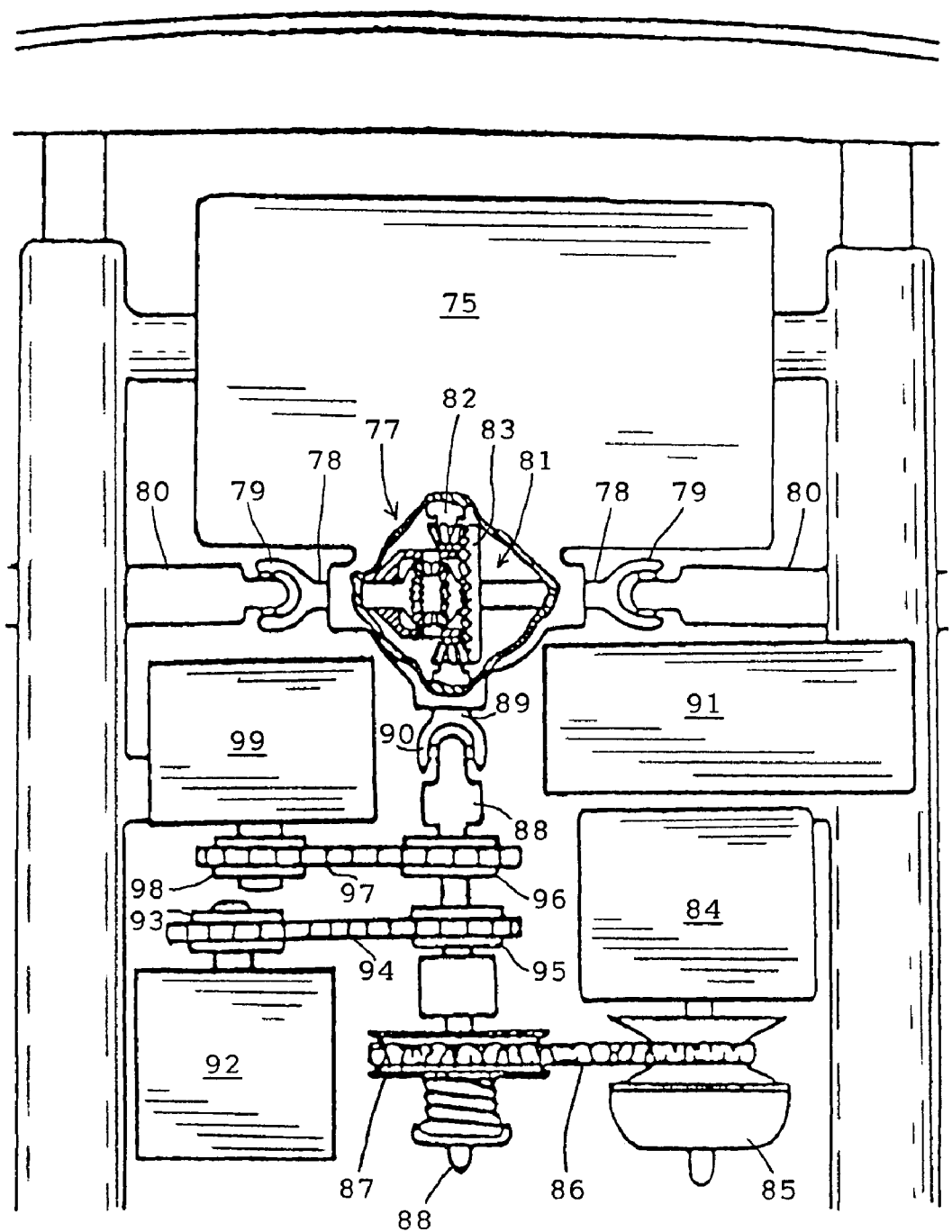
FIG. 4 is a magnified view, partly in section, of a portion of the embodiment of FIG. 3.

FIGS. 3 and 4 illustrate an embodiment of the invention wherein the primary and secondary engines, the electric motor and generator are placed in the front part of the chassis in a front wheel drive vehicle. Primary engine 75 is coupled to the front drive wheels 76 via transaxle 77, half shafts 78, universal joints 79 and axles 80. A transaxle is the combination of a speed change transmission and a differential, usually housed in a common casing. Power from primary (regular) engine 75 is first transmitted to the speed change transmission portion of transaxle 77 then to the differential 81 via internal pinion 82 which meshes with crown wheel 83 of differential 81 from which power is eventually transmitted through half shafts 78, universal joints 79 and axles 80 to drive wheels 76. Power from primary engine 75 is used to accelerate the vehicle from a standing start to cruising speed.

A unique feature of this embodiment is that transaxle 77 has been modified to have an external pinion 89 which also meshes with crown wheel 83 of differential 81. This enables differential 81 to receive power from primary engine 75 via internal pinion 82 and to receive power from another source via external pinion 89.

After the vehicle reaches cruising speed, transaxle 77 is shifted to neutral, thereby disengaging engine 75 from wheels 76 and placing the vehicle in a free wheeling state. Secondary engine 84 is then speeded up, causing drive pulley 85 to engage drive belt 86 and drive driven pulley 87. Driven pulley 87 is fixedly mounted on jack shaft 88 so that, when secondary engine 84 is speeded up, the power transmitted to driven pulley 87 is transmitted via jack shaft 88, rear universal joint 90, external pinion 89, crown wheel 88 differential 81, half shafts 78, side universal joints 79 thence to axles 80 and drive wheels 76, thereby maintaining the vehicle at cruising speed. Meanwhile, primary engine 75 may be run at idle speed, or stopped, to conserve fuel.

When more power is needed to maintain cruising speed, electricity is drawn from battery 91 to drive electric motor 92 which then delivers mechanical power through motor sprocket 93, drive chain 94 and rear sprocket 95 to jack shaft 88, thence through universal joint 90, to pinion 89, differential 81 and eventually through the linkages shown to wheels 76 to assist in maintaining cruising speed.

While the vehicle is in motion, rotation of the wheels 76 is transmitted via axles 80, differential 81 and external pinion 89 to jack shaft 88. Rotation of jack shaft 88 is transmitted through front jack shaft sprocket 96 to generator chain 97 and generator sprocket 98, thereby causing generator 99 to generate electricity for charging battery 91. Other means and features used to maximize regenerative braking are well known in the art and need not be described here.

Figure 5:
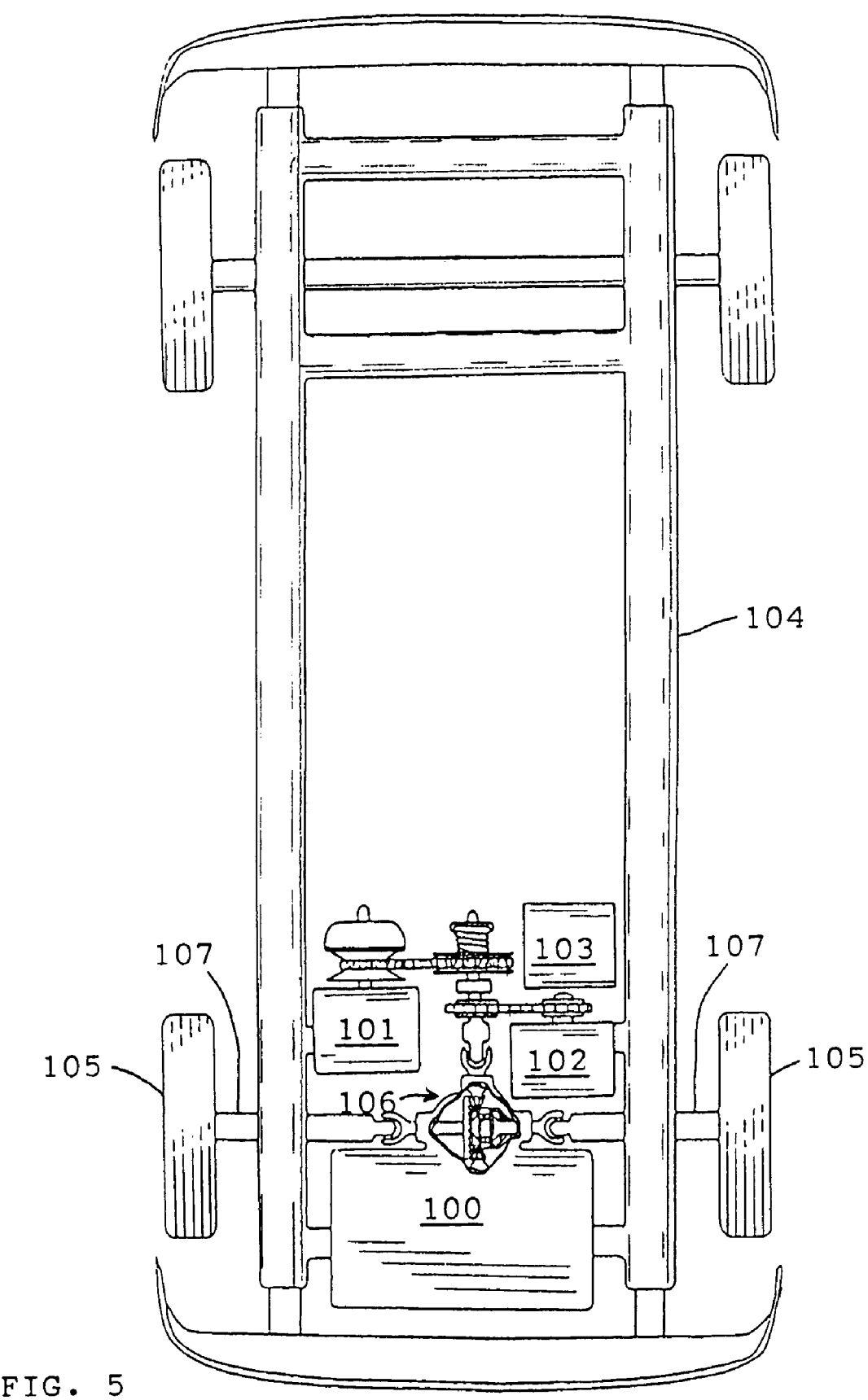
FIG. 5 is a schematic top view of a motor vehicle equipped with a third alternative embodiment of the improved power train of this invention.

FIG. 5 illustrates a third alternative embodiment of the invention wherein primary engine 100, secondary engine 101 and motor/generator 102 are placed in the rear instead of the front portion of the vehicle. The motor/generator 102 is a combination of an electric motor and a generator, and can be switched to function either as an electric motor or as a generator. In the motor mode, it produces mechanical power by drawing power from the battery 103, and in the generator mode it uses engine power or regenerative braking to charge battery 103. FIG. 5 shows primary engine 100, secondary engine 101, motor/generator 102 and storage battery 103, all mounted on chassis 104. Power from primary engine 100 is transmitted to driving wheels 105 via transaxle 106 and axles 107, and is used to accelerate the vehicle to cruising speed. Upon reaching cruising speed the transaxle 106 is shifted to neutral and the vehicle is maintained at cruising speed by power from secondary engine 101 supplemented as needed by power from motor/generator 102.

In all the above embodiments an alternator may be used instead of a generator, and a starter/alternator may be used instead of a motor/generator. Furthermore a motor/generator may be substituted for the separate electric motor and separate generator described hereinabove.

For improved ease of operation, means can be provided for automatically shifting the mode of operation from one being powered by the primary engine to one powered by the secondary engine, and vice versa, as well as to various other combinations, using the electric motor as well. Such automatic shifting operations may be driven by impulses from a vehicular central computer unit utilizing streaming data input from engine speed sensors, vehicle speed sensors and engine load sensors, etc. The shift modes may be actuated through a commonplace cruise control unit.

For further improved ease of operation, the accelerator pedal for the primary engine may be modified to also serve as the accelerator pedal for the auxiliary engine and the electric motor, thereby avoiding the need to provide a separate accelerator pedal for each power source. The linkages for the accelerator pedal may be configured so that when the speed change transmission for the primary engine is in "drive" the accelerator pedal would be connected only to the primary engine, and the connections to the auxiliary engine and electric motor would be automatically disconnected. When the vehicle is running at a predetermined cruising speed and the speed change transmission is shifted to neutral the accelerator pedal would be automatically decoupled from the primary engine (which may be automatically stopped or run at idle speed to conserve fuel), and said pedal would be automatically coupled to the auxiliary engine and electric motor, and used to adjust the power produced for cruising.

For further fuel economy the auxiliary engine may be provided with starter means. The auxiliary engine may then be stopped when it is not in use to conserve fuel, then restarted and accelerated when needed to produce power for cruising. Alternatively, the auxiliary engine may simply be run at idle speed when not in use, yet still be automatically coupled to the accelerator pedal when called upon to produce power for cruising.

The accelerator pedal may be coupled to the electric motor in a manner which permits the motor to increase and decrease its power output at the same pace as the auxiliary engine, thereby adding to its power output. Their combined power make it possible to maintain the vehicle at the desired cruising speed with a reduced power output from the auxiliary engine itself, resulting in further reduction in fuel consumption.

Although the preferred embodiments are described in considerable detail, it is to be understood that various changes and modifications may be made therein without departing from the spirit and scope of the invention which is more fully defined in the appended claims.

Having thus described my invention, what is claimed is:

1. A motor vehicle having a chassis, front and rear paired wheels, at least one of said pairs serving as driving wheels, and an improved power train comprising:
   a) a primary internal combustion engine mounted on said chassis, said primary engine being of suitable size and power to accelerate said vehicle to cruising speed in an acceptable acceleration rate and provide acceptable hill-climbing and load-carrying capacity, a speed change transmission interactive with said primary engine and associated means for transmitting power to said driving wheels,
   b) a secondary internal combustion engine mounted on said chassis, said secondary engine being of suitable size and power so that when operating at maximum efficiency it is capable of maintaining said vehicle at an acceptable cruising speed with maximal fuel efficiency, and associated means for transmitting power to said driving wheels while said vehicle is operated at cruising speed,
   c) an electric motor mounted on said chassis, an associated rechargeable storage battery which activates said motor, a generator which recharges said battery, and power transfer means for transmitting power from said electric motor to said driving wheels to provide supplemental power for cruising,
   d) means for shifting said transmission to "neutral" after said vehicle has been accelerated to cruising speed by said primary engine, and causing said vehicle to be maintained at cruising speed by power from said secondary engine supplemented, as needed, by power from said electric motor, and
   e) means for shifting said transmission to "drive" to supply additional power from said primary engine whenever more power needs to be supplied to said drive wheels beyond that supplied by said secondary engine and electric motor.

2. The motor vehicle of claim 1 wherein said battery is a lead-acid battery.

3. The motor vehicle of claim 1 wherein said primary engine and interactive transmission are original equipment components of said vehicle, as manufactured, and said secondary engine and electric motor are components which have been installed into said vehicle following its manufacture.

4. The motor vehicle of claim 3 wherein said secondary engine and electric motor convey power to the driven wheels without intervention of a speed change transmission.

5. The motor vehicle of claim 4 wherein said primary engine is located in the front portion of the vehicle, and said front wheels are the driving wheels.

6. The motor vehicle of claim 4 wherein the power conveyed by said secondary engine and electric motor is interactive with a differential associated with said driven wheels.

7. The motor vehicle of claim 6 wherein the power conveyed by said secondary engine and electric motor interacts with said differential by way of pinion gear means.

8. The motor vehicle of claim 6 wherein said secondary engine and electric motor are coupled to a common shaft which supplies rotary power to said differential.

9. The motor vehicle of claim 4 wherein said primary engine is located in the front portion of the vehicle, and said rear wheels are the driving wheels.

10. The motor vehicle of claim 1 wherein said generator is caused to produce electrical power by braking action of the vehicle.

11. The motor vehicle of claim 1 wherein said primary and secondary engines and electric motor are located in the front portion of the vehicle.

12. The motor vehicle of claim 11 wherein power is conveyed to said front wheels by way of a transaxle.

13. The motor vehicle of claim 1 wherein said primary and secondary engines and electric motor are located in the rear portion of the vehicle.

14. The motor vehicle of claim 13 wherein power is conveyed to said rear wheels by way of a transaxle.

* * * * *